United States Patent
Lamothe-Brassard

(10) Patent No.: US 10,839,071 B2
(45) Date of Patent: *Nov. 17, 2020

(54) COMPUTER TELEMETRY ANALYSIS

(71) Applicant: Google LLC, Mountain View, CA (US)

(72) Inventor: Maxime Lamothe-Brassard, Mountain View, CA (US)

(73) Assignee: Chronicle LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,405

(22) Filed: Sep. 18, 2019

(65) Prior Publication Data
US 2020/0012786 A1 Jan. 9, 2020

Related U.S. Application Data

(63) Continuation of application No. 15/388,100, filed on Dec. 22, 2016, now Pat. No. 10,430,581.

(51) Int. Cl.
*G06F 21/55* (2013.01)
*H04L 29/06* (2006.01)

(52) U.S. Cl.
CPC .......... *G06F 21/552* (2013.01); *G06F 21/554* (2013.01); *H04L 63/1425* (2013.01); *G06F 2221/034* (2013.01)

(58) Field of Classification Search
CPC .... G06F 17/30; G06F 21/55; G06F 2221/034; H04L 29/06; H04L 29/06877; H04L 63/1416; H04L 63/1433; H04L 63/1491; H04L 63/1425; H04L 9/0836; H04L 12/44; H04L 45/02
USPC .................. 726/22–25; 713/153; 709/252
See application file for complete search history.

(56) References Cited

U.S. PATENT DOCUMENTS

| | | | |
|---|---|---|---|
| 7,162,741 B2 | 1/2007 | Eskin | |
| 8,028,338 B1 | 9/2011 | Schneider et al. | |
| 8,863,293 B2 * | 10/2014 | Christodorescu | G06F 21/00 726/25 |

(Continued)

OTHER PUBLICATIONS

International Search Report and Written Opinion issued in International Application No. PCT/US2017/065555, dated Mar. 29, 2018, 11 pages.

(Continued)

*Primary Examiner* — Saleh Najjar
*Assistant Examiner* — Khalid M Almaghayreh
(74) *Attorney, Agent, or Firm* — Fish & Richardson P.C.

(57) ABSTRACT

Methods, systems, and apparatus, including computer programs encoded on computer storage media, for analyzing telemetry to detect anomalous activity. One of the methods includes accessing data describing a telemetry tree that includes a plurality of nodes and edges; querying, for each of the edges in the telemetry tree using at least one value for the edge from a number of values, historical telemetry data that quantifies an anomaly score for each value to determine whether a relationship indicated by the edge in the telemetry tree represents a potentially malicious relationship; and performing an action using a result of the querying of the historical telemetry data that indicates whether one of the anomaly scores indicates that the relationship indicated by the edge in the telemetry tree represents a potentially malicious relationship.

16 Claims, 8 Drawing Sheets

(56) References Cited

U.S. PATENT DOCUMENTS

| | | | |
|---|---|---|---|
| 9,225,730 B1* | 12/2015 | Brezinski | G06F 21/00 |
| 2004/0181677 A1 | 9/2004 | Hong et al. | |
| 2007/0038622 A1* | 2/2007 | Meyerzon | G06F 16/951 |
| 2007/0294187 A1 | 12/2007 | Scherrer | |
| 2008/0295173 A1 | 11/2008 | Tsvetanov | |
| 2009/0113549 A1* | 4/2009 | Jin | G06F 21/577 |
| | | | 726/25 |
| 2009/0198725 A1* | 8/2009 | Lee | G06F 16/904 |
| 2010/0115620 A1 | 5/2010 | Alme et al. | |
| 2010/0218171 A1 | 8/2010 | Munson et al. | |
| 2012/0079596 A1 | 3/2012 | Thomas et al. | |
| 2012/0224510 A1* | 9/2012 | Bulusu | H04L 45/02 |
| | | | 370/256 |
| 2012/0303555 A1* | 11/2012 | Yakout | G06F 16/215 |
| | | | 706/12 |
| 2013/0318616 A1* | 11/2013 | Christodorescu | H04L 63/1408 |
| | | | 726/25 |
| 2014/0108321 A1* | 4/2014 | Buchanan | G06N 5/02 |
| | | | 706/50 |
| 2014/0324865 A1* | 10/2014 | Mizutani | G06F 11/0703 |
| | | | 707/737 |
| 2016/0004978 A1* | 1/2016 | Goldschmidt | G06F 16/9027 |
| | | | 706/12 |
| 2016/0099953 A1* | 4/2016 | Hebert | H04L 63/1433 |
| | | | 726/23 |
| 2016/0226913 A1* | 8/2016 | Sood | H04Q 9/00 |
| 2018/0278498 A1* | 9/2018 | Zeng | H04L 43/026 |

OTHER PUBLICATIONS

PCT International Preliminary Report on Patentability in International Appln. No. PCT/US2017/065555, dated Jun. 25, 2019, 10 pages.

\* cited by examiner

500

```
┌─────────────────────────────────────────────┐
│ Access data describing a telemetry tree     │
│ that includes a plurality of nodes and edges│
│                                         502 │
└─────────────────────────────────────────────┘
                      │
                      ▼
┌─────────────────────────────────────────────┐
│ Query, for each of the edges in the telemetry│
│ tree using at least one value for the edge  │
│ from the number of values, historical       │
│ telemetry data that quantifies an anomaly   │
│ score for each value to determine whether   │
│ the relationship indicated by the edge in   │
│ the telemetry tree represents a potentially │
│ anomalous relationship                  504 │
└─────────────────────────────────────────────┘
                      │
                      ▼
┌─────────────────────────────────────────────┐
│ Send, for each of the values not included in│
│ the historical telemetry data, a message to │
│ cause a database to add the respective value│
│ with a respective anomaly score to the      │
│ historical telemetry data               506 │
└─────────────────────────────────────────────┘
                      │
                      ▼
┌─────────────────────────────────────────────┐
│ Send, for each of the values included in the│
│ historical telemetry data, a message to     │
│ cause the database to update an anomaly     │
│ score, in the historical telemetry data for │
│ the respective value, that indicates a      │
│ number of times the respective value has    │
│ been seen                               508 │
└─────────────────────────────────────────────┘
                      │
                      ▼
              Does the anomaly
          score satisfy a threshold score?
                     510
           Yes ◄─────────────► No
┌──────────────────────────┐  ┌──────────────────────────┐
│ Send a message to a      │  │ Send a message to a      │
│ second system that       │  │ second system that       │
│ indicates that potentially│ │ indicates that no        │
│ anomalous activity was   │  │ anomalous activity was   │
│ detected             512 │  │ detected             514 │
└──────────────────────────┘  └──────────────────────────┘
```

FIG. 5

COMPUTER TELEMETRY ANALYSIS

CROSS-REFERENCE TO RELATED APPLICATIONS

This application is a continuation application of, and claims priority to, U.S. patent application Ser. No. 15/388,100, titled "COMPUTER TELEMETRY ANALYSIS," filed on Dec. 22, 2016. The disclosure of the foregoing application is incorporated herein by reference in its entirety for all purposes.

BACKGROUND

Anomaly detection systems can analyze data for a computer to determine whether a process executing on the computer is acting anomalous. Anomaly detection systems may determine whether a process should be evaluated for the presence of anomalous or malicious activity. Alternatively, anomaly detection systems may determine whether a process is anomalous, malicious, or both, and, if so, perform a corrective action. Anomaly detection systems may terminate an anomalous process or analyze the process in further detail.

SUMMARY

A system receives a telemetry tree that identifies relationships between telemetry types and corresponding telemetry values that represent processes or actions performed on a computer, among other types of computer telemetry. The system analyzes the relationships to determine an anomaly score for the relationship. The anomaly score may represent a frequency with which the system has previously seen the relationship historically. The anomaly score may represent a likelihood that one of the applications executing on the computer is malicious.

The system may perform an action based on the anomaly score. When the system determines, for a relationship, that the anomaly score does not satisfy a threshold score, the system may send a message to the computer indicating that no malicious activity was detected. When the system determines, for a relationship, that the anomaly score satisfies the threshold score, the system may send a message to the computer indicating that malicious activity may have been detected.

The system may perform a corrective action in response to determining that the anomaly score satisfies the threshold score. For instance, the system may send a message to the computer that indicates that the computer should terminate execution of the process, remove code for the process, or both. The system may generate instructions for presentation of a message to an administrator that identifies the process, the computer, or both, e.g., to allow the administrator to preform corrective action.

Not all anomalous processes are necessarily malicious. For example, a new process resulting from executing newly released software may not be a malicious process. Thus, in some situations, the system may flag the process for further evaluation by a security process instead of automatically performing the corrective action. Other actions can also be taken based on the anomaly score.

In some examples, the system may use one or more relationship values associated with the process to determine whether the system has previously seen the process or a similar process, e.g., that uses some of the same libraries. For instance, the system may navigate the telemetry tree starting at a root node in the tree and analyze the relationships for the edges while traversing the edges in a downward path. When the system identifies a relationship, represented by an edge in the tree, for which the anomaly score satisfies the threshold score, the system may analyze a subtree of the child node connected to the edge to determine whether a relationship that represents the subtree is included in historical telemetry data. When the system determines that a relationship that represents the subtree is included in the historical telemetry data, the system may determine that the system has encountered similar malicious activity in the past. The similar activity may indicate that another process used the same library as the process. The system may use data for the other process to determine a corrective action to take.

In general, one innovative aspect of the subject matter described in this specification can be embodied in methods that include the actions of accessing data describing a telemetry tree that includes a plurality of nodes and edges, wherein each node represents a telemetry value of a telemetry type, and one of the nodes is a root node; each edge connects two of the nodes and indicates a relationship between the two of the nodes connected to the edge; and each edge has a number of values equal to a depth of a deepest child node of the two of the nodes to which the edge connects, and each value represents a relationship between respective spans of nodes in a path from the root node to the deepest child node to which the edge connects; querying, for each of the edges in the telemetry tree using at least one value for the edge from the number of values, historical telemetry data that quantifies an anomaly score for each value to determine whether the relationship indicated by the edge in the telemetry tree represents a potentially malicious relationship; and performing an action using a result of the querying of the historical telemetry data that indicates whether one of the anomaly scores indicates that the relationship indicated by the edge in the telemetry tree represents a potentially malicious relationship. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of generating, for a system, a telemetry tree that includes a plurality of nodes and a plurality of edges, wherein: each node represents a telemetry value of a telemetry type on the system, and one of the nodes is a root node; and each edge connects two of the nodes and indicates a relationship between the two of the nodes connected to the edge; generating, for each of the edges, a quantity of values equal to a depth of a deepest child node of the two of the nodes to which the edge connects, wherein each value represents a relationship between respective spans of nodes in a path from the root node to the deepest child node to which the edge connects; providing, to an analysis system, the telemetry tree and the generated values; and receiving, from the analysis system, data that indicates whether any of the relationships indicated by the edges in the telemetry tree is potentially malicious. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The respective spans of nodes in the path from the root node to the deepest child node to which the edge connects may include spans that each respectively begin from the root node or a descendent child from the root node and each respectively descends to the deepest child node. The descendent child from the root node may be a different node than, and a parent node to, the deepest child node. Each of the values may be a hash value that specifically identifies a respective span that begins from the root node or the descendent child from the root node and each respectively descends to the deepest child node. Querying, for each of the edges in the telemetry tree using at least one value for the edge from the number of values, the historical telemetry data that quantifies an anomaly score for each value may include querying, for each of the edges in the telemetry tree using at least one value for the edge from the number of values, the historical telemetry data to determine a frequency that indicates a number of times the respective value has been seen historically.

In some implementations, querying, for each of the edges in the telemetry tree using at least one value for the edge from the number of values, the historical telemetry data that quantifies an anomaly score for each value may include, for one or more of the values for a particular edge according to an order for the values: querying the historical telemetry data to determine the anomaly score for the respective value; determining whether the anomaly score satisfies a threshold score; and in response to determining that the anomaly score satisfies the threshold score, identifying the particular relationship for the value and between the respective spans of nodes in the path from the root node to the deepest child node to which the edge connects as a potentially malicious relationship and querying the historical telemetry data for additional values for the particular edge; or in response to determining that the anomaly score does not satisfy the threshold score, not querying the historical telemetry data for additional values for the particular edge. Performing an action using a result of the querying of the historical telemetry data that indicates whether one of the anomaly scores indicates that the relationship indicated by the edge in the telemetry tree represents a potentially malicious relationship may include determining whether any of the relationships for the telemetry tree are identified as a potentially malicious relationship; and performing an action using a result of the determining whether any of the relationships for the telemetry tree are identified as a potentially malicious relationship.

In some implementations, performing an action using a result of the determining whether any of the relationships for the telemetry tree are identified as a potentially malicious relationship may include performing an action for the relationships identified as potentially malicious relationships in response to determining that at least one of the relationships for the telemetry tree is identified as a potentially malicious relationship. A system may include a database that includes the historical telemetry data. The database may be a non-relational database.

In some implementations, the method may include sending, for each of the values, a message to cause a database to update an anomaly score, in the historical telemetry data for the respective value, that indicates a number of times the respective value has been seen. The method may include sending, for each of the values not included in the historical telemetry data, a message to cause a database to add the respective value with a respective anomaly score to the historical telemetry data. Performing the action using the result of the querying of the historical telemetry data that indicates whether one of the anomaly scores indicates that the relationship indicated by the edge in the telemetry tree represents a potentially malicious relationship may include determining whether the anomaly score satisfies a threshold score; and in response to determining that the anomaly score does not satisfy the threshold score, sending a message to a second system that indicates that no anomalous activity was detected; or in response to determining that the anomaly score satisfies the threshold score, sending a message to the second system that indicates that potentially anomalous activity was detected.

In some implementations, the method may include performing, using the data, an action in response to receiving the data that indicates whether any of the relationships indicated by the edges in the telemetry tree is potentially malicious. Performing the action may include determining whether the data indicates that one of the relationships indicated by the edges in the telemetry tree is potentially malicious; and in response to determining that the data indicates that one of the relationships indicated by the edges in the telemetry tree is potentially malicious, terminating execution of a process that corresponds to one of the nodes that connects to the edge for which the relationship is potentially malicious; or in response to determining that the data indicates that none of the relationships indicated by the edges in the telemetry tree is potentially malicious, allowing execution of the processes represented by the telemetry tree.

The subject matter described in this specification can be implemented in particular embodiments and may result in one or more of the following advantages. In some implementations, systems and methods that can use a single query to determine statistics for multiple telemetry relationships, e.g., when a potential anomaly is not detected, may reduce resource usage, e.g., computation time, memory, bandwidth, or two or more of these. In some implementations, systems and methods that query a database using telemetry relationship information may more accurately, more quickly, or both, determine anomalous telemetry relationships, e.g., when a telemetry relationship indicates malicious computer activity. For instance, the systems and methods described below may allow a system to analyze telemetry relationships for a large number of computers, e.g., for a cloud based system, more quickly, using fewer resources, or both, compared to other systems and methods. In some examples, use of a non-relational database may allow a system to query the non-relational database for hundreds of telemetry trees each second, e.g., when each telemetry tree includes thousands of relationship values for which the system sends a query to the non-relational database. In some implementations, systems and methods that query a database using telemetry relationship information may more accurately identify new anomalous relationships compared to other systems and methods.

In some implementations, the systems and methods described below may detect zero day problems, advanced persistent threats, reuse of malicious software libraries, or a combination of two or more of these. For instance, the computer analysis system may be able to detect common libraries that are reused between different software applications. The computer analysis system may be able to detect when the name of an overall executable application has changed while the actual libraries used by the application remain the same. For instance, the computer system may determine that a first application that includes a particular subtree may be the same application as a second application identified in the historical telemetry data that includes the same child nodes from the particular subtree but a different root node for the particular subtree, e.g., which may indicate a change in the name of the application.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flow diagram of a process for performing an action based on whether one of multiple anomaly scores indicates that a relationship indicated by a respective edge in a telemetry tree represents a potentially anomalous relationship.

Like reference numbers and designations in the various drawings indicate like elements.

DETAILED DESCRIPTION

Overview

Figure 1:
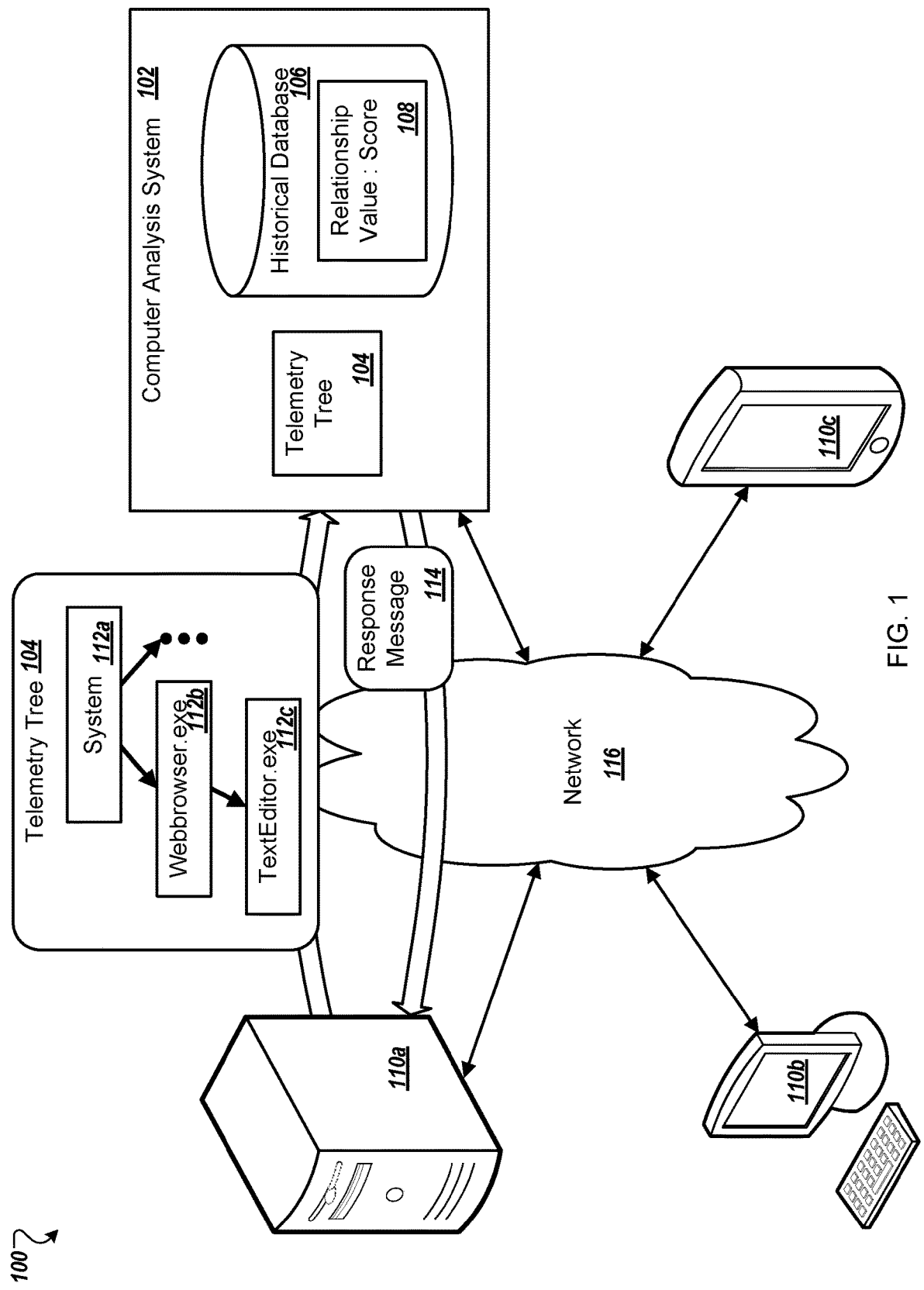
FIG. 1 is an example of an environment in which a computer analysis system receives a telemetry tree.

In some implementations, a computer analysis system may gather telemetry data, e.g., large amounts of telemetry data, from one or more computers. Some of the computers may simulate real computer environments and capture telemetry data from processes and activities that are executing or occur in a simulated environment. Some of the computers may include live environments, e.g., that manipulate data used for other activities such as providing data to an end user. These latter computers may capture data from processes and activities that are executing in the live environment.

As used in this document, telemetry data may include statistical information about hardware, software, or both, of a computer. Some examples types of telemetry data include data about a process, a module, a container, a virtual machine, a domain name, a domain name request, a dynamic-link library ("DLL"), another software library, a port number, an internet protocol ("IP") address, a device identifier, or a device type.

Telemetry data may be a tuple that includes a value representing a telemetry type and a value for the telemetry type. For instance, a tuple may indicate a process telemetry type and the value may indicate the name of the process. The telemetry value may be any appropriate type of value, such as text for a process name, a number for a port, or an IP address.

A computer analysis system may use the telemetry data to build a database of historical telemetry data that indicates relationships between telemetry values. For instance, the computer analysis system may generate relationship values, as described in more detail below, that represent a relationship between two telemetry values in a telemetry tree. The relationship values may include data representing one or more different telemetry values along a span of nodes in a telemetry tree, e.g., in which the span indicates a direct path that connects two nodes in the telemetry tree such as a root node and a leaf node. For example, a relationship value may represent a multi-level relationship between two telemetry values in a telemetry tree.

A historical database may indicate a number of times a particular relationship has occurred in the historical telemetry data, e.g., in the telemetry data gathered from the computers used to create the historical telemetry data. When the historical telemetry data indicates that the number of times the particular relationship occurred satisfies a threshold value, e.g., is less than or equal to the threshold value, the computer analysis system may label a corresponding relationship as anomalous. When the number of times does not satisfy the threshold value, e.g., is greater than the threshold value, the computer analysis system may label a corresponding relationship as not anomalous.

During runtime, the computer analysis system can generate and query statistics for telemetry relationships to determine whether the telemetry relationships are potentially anomalous. For instance, the computer analysis system may receive a telemetry tree from a computer. The telemetry tree may represent telemetry data for the computer over a particular period of time, e.g., the past day or week. The particular period of time may be any appropriate period of time. In some examples, the particular period of time may be a prior time, e.g., a day that occurred a month or a week ago.

The telemetry tree may not represent telemetry for a single instant in time. for instance, the telemetry tree may identify telemetry for various processes that were executed at any time within the particular period of time.

The computer analysis system analyzes the nodes in the telemetry tree, each node of which represent a telemetry tuple that identifies a telemetry type and a telemetry value for the telemetry type. The computer analysis system may determine relationship values for the nodes in the telemetry tree and query the historical telemetry data using the relationship values. The computer analysis system may use the results of the query to determine whether a particular relationship is potentially anomalous and whether to perform corrective action.

Example Environment

FIG. 1 is an example of an environment 100 in which a computer analysis system 102 receives a telemetry tree 104. The computer analysis system 102 may use the telemetry tree 104 to create historical database 106. In some examples, the computer analysis system 102 may query the historical database 106 using data from the telemetry tree 104 to determine whether a first computer 110a, for which the telemetry tree 104 was generated, has an anomalous telemetry relationship.

The nodes 112a-c in the telemetry tree 104 may represent a collection of telemetry data points for the first computer 110a. For instance, each node of the nodes 112a-c may represent a particular telemetry type and include a corresponding telemetry value, e.g., as a telemetry tuple.

Each node of the nodes 112a-c may have one or more child nodes. The child nodes indicate telemetry types initiated or used by the parent node. For instance, a root node 112a in the telemetry tree 104 may represent an initial system process for the first computer 110a. The root node 112a may be for a root or initial process executed on the first computer 110a during a boot process. The root node 112a may have one or more child nodes, such as a web browser process 112b. Each of the child nodes of the root node 112a were initialized by the root node 112, e.g., during a boot process, in response to user input, or in response to occurrence of another activity.

In some examples, a child node may indicate a type of telemetry used by a parent node. For instance, a child node may indicate a port used by a parent process to communicate across a network or with another computer. A child node may indicate a domain name accessed by a parent process or a software library used by a parent process.

The computer analysis system 102 may generate, for each edge in the telemetry tree 104, a relationship value that represents a relationship for the corresponding edge. For instance, the computer analysis system 102 may generate a hash of the telemetry values of two connected nodes. The computer analysis system 102 may include, as input to the hash, the relationship value for a parent node and the grandparent node of the child node from the two connected nodes.

Figure 2:
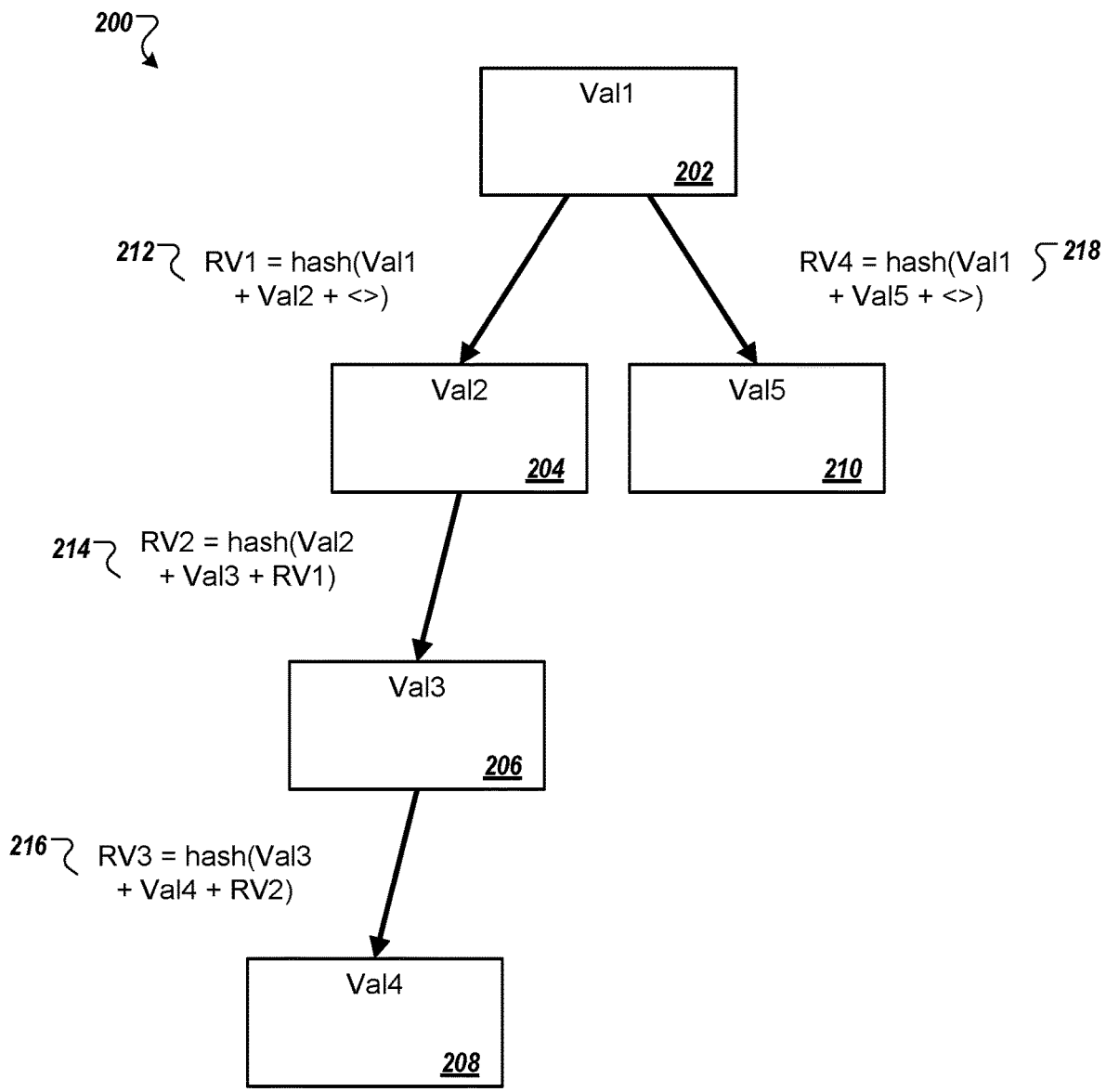
FIG. 2 shows an example of a telemetry tree with root relationship values.

FIG. 2 shows an example of a telemetry tree 200 with root relationship values. The computer analysis system 102 may generate, for each edge in the telemetry tree 200, a root relationship value using a telemetry value for a child node connected to the edge, and a telemetry value for a parent node connected to the edge. Here, a root relationship value includes information about a child node connected to the edge and all nodes between the child node and a root node for the telemetry tree 200. The computer analysis system 102 may generate a root relationship value for an edge using a root relationship value for an edge between the parent node and a grandparent node, if one exists.

For example, the computer analysis system 102 may generate a root relationship value, RV, for an edge using Equation (1) below. childVal is the telemetry value of the child node connected to the edge. parentVal is the telemetry value of the parent node connected to the edge. RV(grandparentVal, parentVal) is the root relationship value for the edge that connects the parent node and the grandparent node, if that edge exists. If that edge does not exist, e.g., and the computer analysis system 102 is determining a relationship value for an edge connected to a root node 202, the computer analysis system 102 uses only childVal and parentVal to determine the relationship value.

$$RV = \text{hash}(\text{parentVal} + \text{childVal} + RV(\text{grandparentVal}, \text{parentVal})) \quad (1)$$

The use of the relationship value for the edge up one level in the telemetry tree allows the computer analysis system 102 to define a relationship value that includes information for all of the nodes on the path between the child node and the root node of the telemetry tree 200. For instance, when generating a first root relationship value RV1 212 that connects the root node 202 and a first child node 204, the computer analysis system 102 computes a hash of the telemetry values Val1 and Val2, for the two nodes 202, 204, respectively. This first root relationship value RV1 212 includes information for the root node 202 because the first root relationship value RV1 212 is a hash of the root telemetry value Val1 along with the child telemetry value Val2.

When generating a second root relationship value RV2 214 for the edge between the first child node 204 and a grandchild node 206, the computer analysis system 102 computes a hash of the telemetry values Val2 and Val3 for the two nodes 204, 206, respectively, and the first root relationship value RV1 212. Since the first root relationship value RV1 212 represents data for the root node 202 which is included as input for the hash used to generate the second root relationship value RV2 214, the second root relationship value RV2 214 also represents data for the root node 202. This allows the computer analysis system 102 to generate relationship values that represent not only the two nodes that are connected to each other, using the respective telemetry values Val2 and Val3 for the two nodes, but that also represents the values in the path to and including the root node 202, e.g., Val1. This way the computer analysis system 102 generates a different root relationship value when the first child node 204 and the grandchild node 206 are connected to a different parent node, a different root node 202, or both.

For example, when the computer analysis system 102 generates a relationship value for two nodes with telemetry values of Val2 and Val3, while the root node has a value of ValX, the relationship value would be RV=hash(Val2+Val3+RV(ValX+Val2)). This relationship value is a different relationship value that the second root relationship value RV2 214 because of the different telemetry value, ValX instead of Val1, for the root node.

The computer analysis system 102 generates root relationship values for the remaining edges in the telemetry tree 200. For instance, the computer analysis system 102 generates a third root relationship value RV3 216 that represents a relationship between the grandchild node 206 and the great-grandchild node 208. The third root relationship value RV3 216 also includes information specific to the parent node 204 and the root node 202 because the computer analysis system 102 uses the second root relationship value RV2 214 as input for the generation of the third root relationship value RV3 216.

The computer analysis system 102 may also generate root relationship values for other branches in the telemetry tree 200. For instance, the computer analysis system 102 may generate a fourth relationship value RV4 218 for an edge connecting the root node 202 and a second child node 210. The fourth relationship value RV4 218 does not include any information about the nodes in the first branch of the tree because a path connecting the second child node 210 to the root node 202 does not include any of those nodes. For instance, the fourth relationship value RV4 218 includes only information about telemetry values Val1 and Val5 for the root node 202 and the second child node 210.

The computer analysis system 102 may generate relationship values for each of the edges in the telemetry tree 200 based on a depth of a child node connected to the edge, with the root node 202 being at a depth of zero. For example, the computer analysis system 102 may generate a two subtree relationship values for the grandchild node 206 and three subtree relationship values for the great-grandchild node 208. Subtree relationship values identify and are specific to a particular subtree in a telemetry tree that may or may not include the root node. In some examples, the computer analysis system 102 may generate a total number of subtree relationship values for each of the edges that is equal to a depth of the child node connected to the edge in the telemetry tree 200.

In some implementations, the computer analysis system 102 may generate subtree relationship values using root relationship values. For instance, the computer analysis system 102 may receive, from the first computer 110a, a tree that includes root relationship values. The computer analysis system 102 uses the root relationship values to generate subtree relationship values. The computer analysis system 102 may include a database that maps root relationship values to subtree relationship values. The computer analysis system 102 can use this mapping because each of the root relationship values is unique to the particular nodes in the tree on the path from the child node connected to the edge and the root node. If any one of those nodes were different, the computer analysis system 102 would have a different root relationship value. In some examples, the computer analysis system 102 may use root relationship values to generate a telemetry tree, e.g., the original values for the tree, and determine subtree relationship values using the generated telemetry tree.

Figure 3:
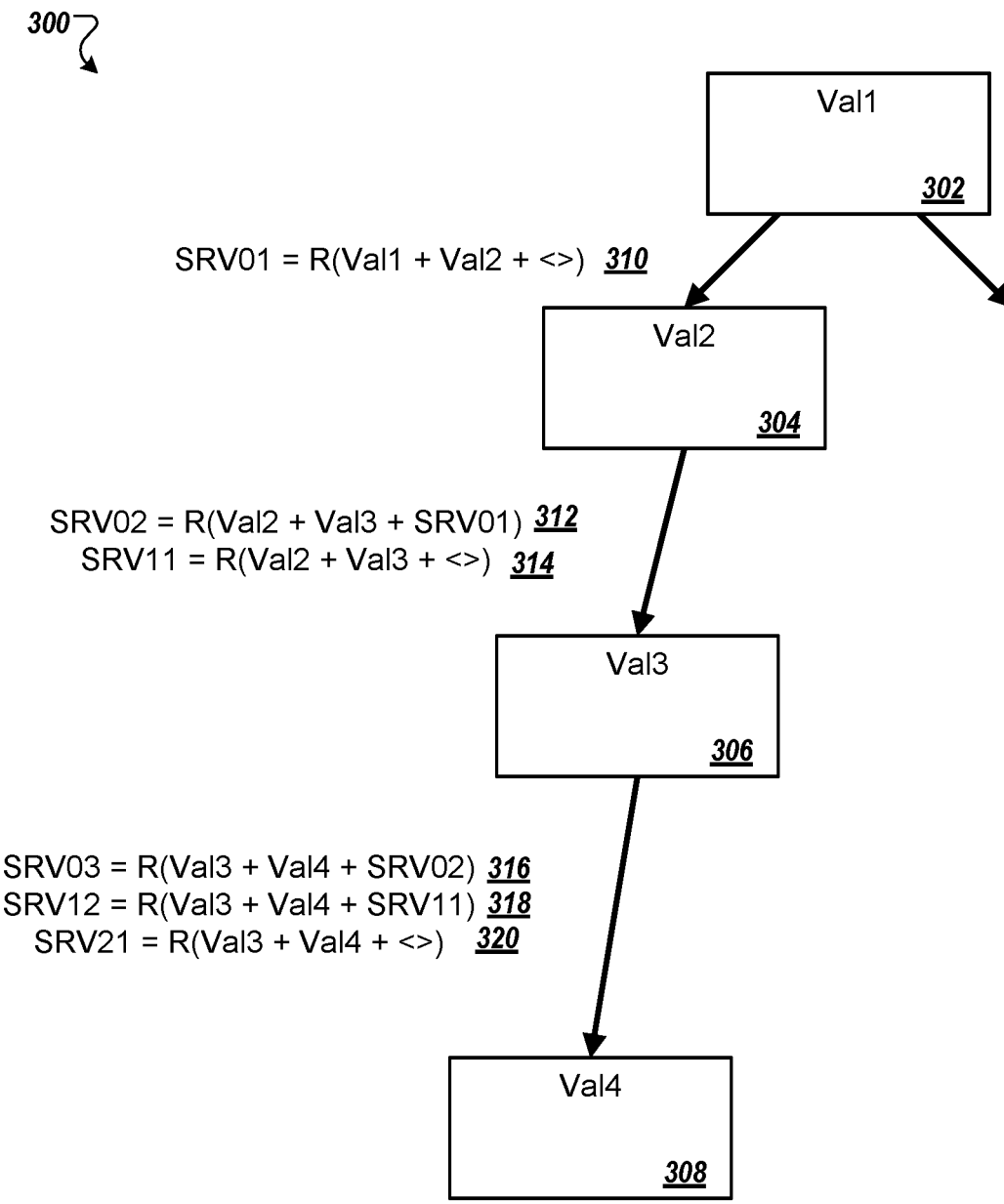
FIG. 3 shows an example of a telemetry tree with subtree relationship values.

FIG. 3 shows an example of a telemetry tree 300 with subtree relationship values. The computer analysis system 102 generates a number of subtree relationship values, SRV, for each edge based on a depth of the subtree in the telemetry tree 300. In general, each edge has a number of SRVs that is equal to a depth of a deepest child node of the two of the nodes to which the edge connects. As will be described in more detail below, node 308, which descends to a depth of three from a root node 302, is connected to an edge having three SRVs; node 306, which descends to a depth of two from a root node 302, is connected to an edge having two SRVs, and node 304, which descends to a depth of one from a root node 302, is connected to an edge having one SRV.

Additionally, each SRV represents a relationship between respective spans of nodes in a path from the root node to the deepest child node to which the edge connects. For example, the computer analysis system 102 may generate one or more subtrees, SRV<SubtreeRoot><TreeDepth>, for each edge such that SubtreeRoot identifies the root node for the particular subtree along a particular path in the telemetry tree 300 and TreeDepth identifies the depth of the respective subtree. For the telemetry tree 300, SRV01 represents a relationship between root node 302 and child node 304; SRV02 represents a relationship between a span from the root node 302 to the child node 306, and SRV11 represents a relationship between a span from the child node 304, e.g., a descendent child node of the root node, to the child node 306; and so on.

For instance, the computer analysis system 102 may generate one or more subtree relationship values, SRVs, for an edge using Equation (2) below. childVal is the telemetry value of the child node connected to the edge. parentVal is the telemetry value of the parent node connected to the edge. SRV(grandparentVal, parentVal) is the subtree relationship value for the edge that connects the parent node and the grandparent node, if that edge exists.

$$SRV=R(parentVal+childVal+SRV(grandparentVal, parentVal)) \quad (2)$$

The computer analysis system 102 may generate each of the subtree relationship values using a hash function R or another function that generates a unique value that identifies the child node of a corresponding edge and one or more nodes in a path between the child node and root node of the telemetry tree 300. In some examples, the hash function R is the same hash function, "hash", used in Equation (1) above. In some examples, the hash function R is a different hash function than the hash function, "hash", used in Equation (1) above. The computer analysis system determines a quantity of nodes in the path to use for the hash function or the other function based on a depth of the subtree and the node that is the root for the particular subtree.

For example, for the first edge in the telemetry tree 300, SRV01 indicates a subtree that begins at a root node 302, identified by the value of zero, and with a depth of one. The computer analysis system 102 generates a first subtree relationship value SRV01 310 using telemetry values Val1 and Val2 for the root node 302 and a child node 304, respectively.

For the second edge in the telemetry tree 300, SRV02 indicates a subtree that begins at the root node 302 and has a depth of two. The computer analysis system 102 generates a second subtree relationship value SRV02 312 using telemetry values Val2 and Val3 for the child node 304 and a grandchild node 306, respectively, and the first subtree relationship value SRV01 310. SRV11 indicates a subtree that begins at the child node 304, e.g., the first child of the root node in the respective span of the telemetry tree 300, with a depth of one. The computer analysis system 102 generates a third subtree relationship value SRV11 314 using only the telemetry values Val2 and Val3 for the child node 304 and the grandchild node 306, respectively, and without using any other telemetry values or relationship values.

Similarly, for the third edge in the telemetry tree 300, SRV03 is for a subtree that begins at the root node 302 and has a depth of three. The computer analysis system 102 generates a fourth subtree relationship value SRV03 316 using telemetry values Val3 and Val4 for the grandchild node 306 and a great-grandchild node 308, respectively and the second subtree relationship value SRV02 312. The computer analysis system 103 generates the fourth subtree relationship value SRV03 using data for all of the nodes in the telemetry tree 300 between and including the root node 302 and the great-grandchild node 308, which is three nodes below the root node 302 as represented by the depth of the subtree. The computer analysis system 102 generates a fifth subtree relationship value SRV12 318 and a sixth subtree relationship value SRV21 320 using the process described above.

In some examples, the computer analysis system 102 may use the root relationship values as the subtree relationship values for the subtrees that begin at the root node 302 of the telemetry tree 300. For instance, the first subtree relationship value SRV01 310 may be the same value as the first root relationship value RV1 212. When the computer analysis system 102 receives a telemetry tree 300 that includes the root relationship values, the computer analysis system 102 may determine the values for the nodes in the tree and generate the telemetry tree 300 using the root relationship values.

In some implementations, the computer analysis system 102 may receive a telemetry tree that includes only root relationship values for the leaves in the tree. For instance, when the telemetry tree 300 includes only the great-grandchild node 308 as a leaf node, and no additional leaf nodes, the computer analysis system 102 may receive only the fourth subtree relationship value SRV03 316, which is also the third root relationship value RV3 216. The computer analysis system 102 uses the fourth subtree relationship value SRV03 316 to generate relationship values for the other nodes in the telemetry tree 300. Receipt of root relationship values for only leaf nodes in a telemetry tree may reduce network bandwidth requirements for the computer analysis system 102 receiving a telemetry tree of a computer. The computer analysis system 102 may generate relationship values on the fly as necessary for determining whether a particular relationship is anomalous.

Returning to FIG. 1, the computer analysis system 102 builds the historical database 106 using the telemetry tree 104 and data for multiple other telemetry trees. For instance, the computer analysis system 102 initially builds the historical database 106 by creating an entry 108 in the historical database 106 for each relationship value included in the telemetry tree 104, and any other telemetry trees. The historical database 106 includes historical telemetry data that quantifies an anomaly score for each relationship value. The computer analysis system 102 may query the historical telemetry data, using a relationship value, to determine whether the relationship indicated by the edge in the telemetry tree represents a potentially malicious relationship.

Each entry 108 indicates a relationship value and a respective score for the relationship value. The score indicates a likelihood that the respective relationship value is anomalous. In some examples, the score may be a counter that indicates a number of times the computer analysis system 102 has previously seen the respective relationship value. For instance, when the telemetry tree 104 includes a system node 112*a* and a web browser process 112*b* as a child of the system node 112*a*, the computer analysis system 102 may increment the counter in a respective historical database 106 entry 108 any time that the computer analysis system 102 sees the respective relationship value.

In some implementations, the scores may be anomaly scores. The computer analysis system 102 may determine whether to update the score each time the computer analysis system 102 sees the respective relationship while building the historical database 106. For instance, when the computer analysis system 102 determines that the likelihood that the relationship is anomalous has changed based on seeing the relationship again, the computer analysis system 102 may update the score.

The computer analysis system 102 may store the historical database 106 in a non-relational database. For example, the computer analysis system 102 may use a non-relational database as the historical database 106 for fast write and read access. The use of a non-relational database may allow the computer analysis system 102 to generate less complex queries to update, retrieve, or both, scores for respective relationship values.

In some examples, when creating the historical database 106, the computer analysis system 102 queries each of the relationship values for an edge and increments the respective counter. For instance, the computer analysis system 102 may query the historical database 106 using each of the subtree relationship values for the telemetry tree 104 and update the corresponding scores in the historical database 106.

During runtime, the computer analysis system 102 uses the relationship values to determine scores for one or more relationships associated with each edge. For instance, the computer analysis system 102 may receive the telemetry tree 104 during runtime and queries the historical database 106 using a single relationship value for each of the edges to determine whether the respective sub-tree is potentially anomalous. The computer analysis system 102 may query additional relationship values for a particular edge, as described in more detail below, when the computer analysis system 102 determines that a relationship value for the particular edge has a score identifying the relationship as potentially anomalous.

Figure 4:
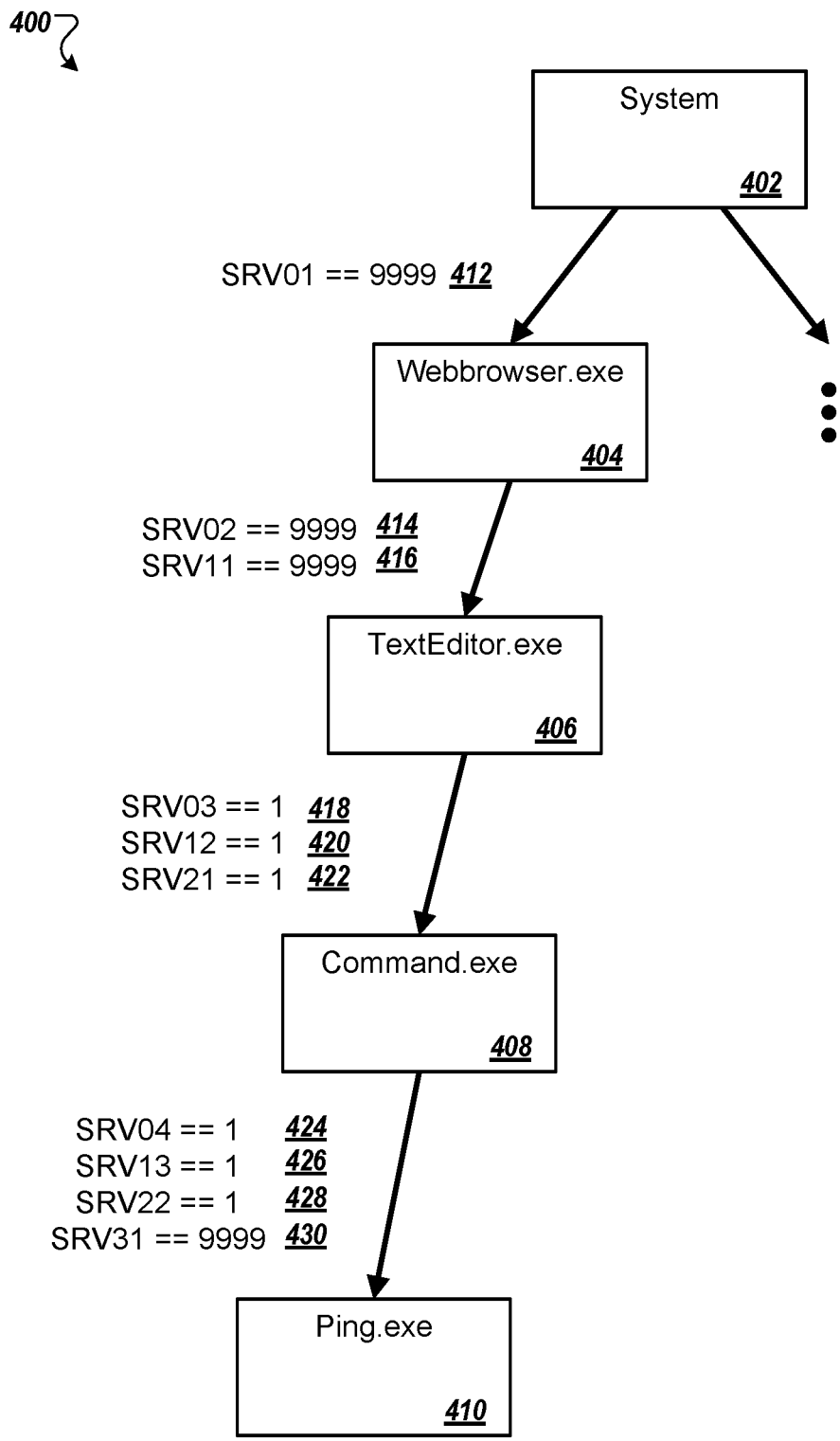
FIG. 4 shows an example of a telemetry tree with anomaly scores for respective relationship values.

FIG. 4 shows an example of a telemetry tree 400 with anomaly scores for respective relationship values. For instance, the telemetry tree 400 may be a portion of the telemetry tree 104 shown in FIG. 1. The computer analysis system 102 may use the subtree relationship values, described with reference to FIG. 3, to query the historical database 106 and receives anomaly scores in response. The computer analysis system 102 may traverse the telemetry tree 400 to determine whether any of the relationships represented by the telemetry tree 400 are potentially anomalous.

For example, the computer analysis system 102 may send a first subtree relationship value SRV01 to the historical database 106. In response, the computer analysis system 102 receives an anomaly score of "9999" from the historical database 106. Here, the string "SRV01==9999" indicates that the computer analysis system 102 provided the relationship value for SRV01 to the historical database 106 and received a value of 9999 in response. For instance, the historical database 106 determines a key-value pair using the first subtree relationship value SRV01 and provides the value to the computer analysis system 102.

The computer analysis system 102 determines that the anomaly score of 9999 indicates that a first relationship between the system process 402 and the web browser process 404 is not anomalous. For instance, a score of "9999" may indicate a non-anomalous relationship because the relationship has been seen many times. In some examples, the score of "9999" may indicate that the relationship SRV01 has been seen at least 9999 times. The computer analysis system 102 may consider a score of "1", or another value below a threshold value, to be anomalous because the relationship has been seen only a few number of times, e.g., once.

Similarly, the computer analysis system 102 may determine one or more anomaly scores for a relationship with a text editor process 406 as a child node. The computer analysis system 102 may query the historical database 106 using a second subtree relationship value SRV02 414. Using a result of the query, the computer analysis system 102 may determine that the relationship represented by the system process 402 as a root process, the web browser process 404 as a child process, and the text editor process 406 as a grandchild process is not anomalous.

When the computer analysis system 102 determines that a particular relationship is not likely anomalous for a particular edge, the computer analysis system 102 does not need to analyze any of the remaining relationship values for the particular edge. For instance, the computer analysis system 102 determines that all of the other relationship values, e.g., a third subtree relationship value SRV11 416, would also not be anomalous because the initial, e.g., root relationship value, is not anomalous. This allows the computer analysis system 102 to issue a single query to the historical database 106 to determine whether a subtree is anomalous when that subtree does not include any anomalous relationships, e.g., saving computation time, resources, power, or a combination of two or more of these.

When the computer analysis system 102 determines that a particular relationship is likely anomalous, the computer analysis system 102 queries the historical database 106 using multiple relationship values for the respective edge.

For example, when the computer analysis system 102 determines that a fourth subtree relationship value SRV03 418 has an anomaly score of "1", and is likely anomalous, the computer analysis system 102 queries the historical database 106 using other relationship values for the respective edge. The computer analysis system 102 may determine, as a result of the additional queries, a particular location in the telemetry tree 400 at which the potentially anomalous relationship occurs.

In the example shown in FIG. 4, the computer analysis system 102 receives anomaly scores of "1" for the fourth subtree relationship value SRV03 418, a fifth subtree relationship value SRV12 420, and a sixth subtree relationship value SRV21 422. Using these anomaly scores, the computer analysis system 102 can determine that the relationship between the text editor process 406 and the command process 408 is likely anomalous. For instance, the computer analysis system 102 may determine that the text editor process 406 does not usually initiate the command process 408. The computer analysis system 102 may determine that the text editor process 406 has potentially been infected, e.g., with a computer virus, and that the infection initiated execution of the command process 408.

The computer analysis system 102 may continue down the telemetry tree 400 to determine whether other relationships, in the same span of the telemetry tree 400, are potentially anomalous. For instance, the computer analysis system 102 may determine four subtree relationship values SRV04 424, SRV13 426, SRV22 428, and SRV31 340, for an edge connecting the command process 408 with a ping process 410. As indicated above, the computer analysis system 102 determines relationship values for this edge until one of the relationship values is not anomalous. If there were additional relationship values for the edge connected the command process 408 with the ping process 410, the computer analysis system 102 would stop querying the historical database 106 upon determining that the tenth subtree relationship value SRV31 340 is "9999", indicating that a relationship between the command process 408 and the ping process 410 is not anomalous. The computer analysis system 102 does not need to analyze any other relationship values for the edge because the indication that a particular relationship value, based on the order in which the relationship values are evaluated, indicates that all other relationship values are not likely anomalous.

The computer analysis system 102 uses the various anomaly scores to pinpoint the location of the anomaly. Using the four subtree relationship values SRV04 424, SRV13 426, SRV22 428, and SRV31 340, the computer analysis system 102 determines that, although the relationship between the command process 408 and the ping process 410 is not anomalous, the computer analysis system 102 has not frequently seen this relationship with the command process 108 as a child of the text editor process 406. Using the three subtree relationship values SRV03 418, SRV12 420, and SRV21 422, the computer analysis system 102 also determines that the relationship between the text editor process 406 and the command process 408 is potentially anomalous. The computer analysis system 102 may analyze multiple different levels of the telemetry tree 400 in case there are multiple different potential anomalies at different levels of the tree, e.g., in case the relationship between the command process 408 and the ping process 410 were potentially anomalous.

Returning to FIG. 1, the computer analysis system 102 can determine an action to perform based on whether or not the historical database 106 returned a score indicating that at least one relationship in the telemetry tree 104 is anomalous. For instance, when the computer analysis system 102 receives only scores that indicate non-anomalous relationships, the computer analysis system 102 may determine to perform no additional action or to send a response message 114 to the first computer 110a that indicates that the first computer 110a does not likely have any anomalous activity.

When the computer analysis system 102 receives a score for the telemetry tree 104 that indicates that there is at least one anomalous relationship, the computer analysis system 102 may determine a corrective action that should be performed. The corrective action may be any appropriate action for the computer analysis system 102, another computer, or both. For example, the computer analysis system 102 may send a response message 114 to the first computer 110a that indicates the particular relationship that is anomalous. The response message 114 may identify an action the first computer 110a should perform. For instance, the response message 114 may cause the first computer 110a to terminate a process associated with the anomalous relationship. The process may be a child process, a parent process, or both, of the edge associated with the anomalous relationship.

In some examples, the response message 114 may cause the first computer 110a to terminate all processes identified in a particular subtree of the telemetry tree 104. For example, when the computer analysis system 102 determines that a relationship between the web browser process 112b and the text editor process 112c is potentially anomalous, the response message 114 may cause the first computer 110a to terminate the web browser process 112b, the text editor process 112c, and any child processes of these two processes, e.g., a command process and a ping process.

In some implementations, the computer analysis system 102 may send instructions to a second computer 110b or a third computer 110c that cause presentation of a user interface. The user interface may include a presentation of the telemetry tree 104. The second computer 110b or the third computer 110c may use the instructions to generate the user interface and present the user interface, e.g., to an analyst. The user interface may indicate one or more anomaly scores for the telemetry tree 104. When there is an anomaly in the telemetry tree, the user interface may include a user interface element that highlights where the anomaly occurred, e.g., by presenting the nodes with the anomalous relationship in a different color. The user interface may allow the analyst to perform a corrective action based on the potentially anomalous activity.

In some examples, the computer analysis system 102 may analyze telemetry trees 104 for multiple computers. For instance, the computer analysis system may analyze a telemetry tree 104 for the first computer 110a, a second telemetry tree for the second computer 110b, and a third telemetry tree for the third computer 110c.

The computer analysis system 102 is an example of a system implemented as computer programs on one or more computers in one or more locations, in which the systems, components, and techniques described in this document are implemented. The computers 110a-c may include personal computers, mobile communication devices, and other devices that can send and receive data over a network 116. The network 116, such as a local area network (LAN), wide area network (WAN), the Internet, or a combination thereof, connects the computers 110a-c, and the computer analysis system 102. The computer analysis system 102 may use a single server computer or multiple server computers operating in conjunction with one another, including, for example, a set of remote computers deployed as a cloud computing service.

Example System Process Flow FIG. 5 is a flow diagram of a process 500 for performing an action based on whether one of multiple anomaly scores indicates that a relationship indicated by a respective edge in a telemetry tree represents a potentially anomalous relationship. For example, the process 500 can be used by the computer analysis system 102 from the environment 100.

A computer analysis system accesses data describing a telemetry tree that includes a plurality of nodes and edges (502). For example, the computer analysis system accesses the data describing the telemetry tree from a memory. In some examples, the computer analysis system receives the data describing the telemetry tree, e.g., from another system such as the computer for which the telemetry tree was generated.

Each node in the telemetry tree represents a telemetry value of a telemetry type. One of the nodes is a root node for the telemetry tree. Each edge in the telemetry tree connects two of the nodes and indicates a relationship between the two of the nodes connected to the edge. Each edge may have a number, i.e., quantity, of values, e.g., relationship values, equal to a depth of a deepest child node of the two of the nodes to which the edge connects. Each value for an edge in the telemetry tree represents a relationship between respective spans of nodes in a path from the root node to the deepest child node to which the edge connects.

The computer analysis system queries, for each of the edges in the telemetry tree using at least one value for the edge from the number of values, historical telemetry data that quantifies an anomaly score for each value to determine whether the relationship indicated by the edge in the telemetry tree represents a potentially anomalous relationship (504). For instance, the computer analysis system may perform one or more of the steps described below with reference to FIG. 6 to query the historical telemetry data and determine whether the relationship indicated by the edge represents a potentially malicious relationship.

The computer analysis system sends, for each of the values not included in the historical telemetry data, a message to cause a database to add the respective value with a respective anomaly score to the historical telemetry data (506). For example, the computer analysis system may determine that the relationships represented by the values have not been seen previously and add the values to the historical telemetry data. The computer analysis system may create an entry in a historical database for the value. The entry may include the value and an anomaly score that indicates a likelihood that the relationship represented by the value is potentially anomalous. The computer analysis system may initialize the anomaly score as a value of zero, e.g., for a counter that is incremented each time the value is seen in a telemetry tree. The anomaly score may be any appropriate value. For instance, when the anomaly score is a counter, the anomaly score is a non-zero integer.

In some implementations, the computer analysis system determines that a value for which there is no corresponding entry included in the historical telemetry data is anomalous. The computer analysis system may determine whether similar relationships have been seen in the past, e.g., whether the historical telemetry data includes a second value for a subtree of the edge for which the historical telemetry data does not include a first value. In this case, the computer analysis system may determine that the subtree has been seen before and an action to perform based on previous analysis of the subtree.

The computer analysis system sends, for each of the values included in the historical telemetry data, a message to cause the database to update an anomaly score, in the historical telemetry data for the respective value, that indicates a number of times the respective value has been seen (508). For example, the computer analysis system may update the anomaly score, stored in the historical database, for the value based on a new likelihood that the value is potentially anomalous. In some examples, the anomaly score may be a counter. In these examples, the computer analysis system may increment the anomaly score by a value of one.

In some implementations, the computer analysis system may assign the value an anomaly score that indicates that the value represents a potentially anomalous relationship and stop updating the anomaly score. For instance, the computer analysis system may assign a score of "potentially anomalous," e.g., as a text string, so that continuously updating the score will not label a potentially anomalous relationship as non-anomalous because the potentially anomalous relationship occurs frequently, e.g., when a large number of computers are infected with a virus.

In some implementations, the computer analysis system may receive feedback from other systems, e.g., a computer, that indicates that a potentially anomalous relationship is anomalous, malicious, or both. When the computer analysis system determines that the feedback represents at least a threshold likelihood that other occurrences of the relationship are also likely anomalous, the computer analysis system changes the anomaly score, e.g., to a string value, and stops updating the anomaly score for the value upon further detection of the value, e.g., so that the respective relationship is always flagged as potentially anomalous. In some examples, the computer analysis system may set a flag that indicates that the anomaly score should not be updated to ensure that the respective relationship continues to be identified as potentially anomalous.

The computer analysis system determines whether the anomaly score satisfy a threshold score (510). For example, the computer analysis system compares the anomaly score with the threshold score. When the anomaly score is a numerical value, the computer analysis system may determine whether the anomaly score is less than the threshold score. In some examples, the computer analysis system may determine whether the anomaly score is less than or equal to the threshold score, greater than the threshold score, or greater than or equal to the threshold score.

In some implementations when the anomaly score may be a string value, the computer analysis system may determine whether the anomaly score is the same string as the threshold score. For instance, the computer analysis system may determine whether the anomaly score is the string "potentially anomalous," "anomalous," "malicious," or a combination of two or more of these, in addition to other string values.

In response to determining that the anomaly score satisfies the threshold score, the computer analysis system sends a message to a second system that indicates that potentially anomalous activity was detected (512). For example, the computer analysis system sends a message to a second system that identifies the potentially anomalous relationship. Receipt of the message may cause the second system to generate a user interface that includes information about the potentially anomalous relationship. The computer analysis system may send a message to a second system to cause the second system to perform an automated activity, e.g., to terminate a process associated with the potentially anomalous activity or analyze the process to determine if it is a process for a new application. The second system may be the computer for which the telemetry tree was generated.

In some implementations, when the second system is a client device, the computer analysis system may receive data from an antivirus application executing on the client device. The computer analysis system receives the telemetry tree from the antivirus application and determines whether any potentially anomalous applications or processes are or were executing on the client device based on the telemetry activity represented in the telemetry tree. When the computer analysis system determines that potentially anomalous activity is detected, the computer analysis system sends the client device, e.g., the antivirus application, a message that identifies the relationship, a process associated with the relationship, corrective action for the client device to perform, or a combination of two or more of these. The client device receives the message and performs a corresponding action.

In response to determining that the anomaly score does not satisfy the threshold score, the computer analysis system sends a message to a second system that indicates that no anomalous activity was detected (514). For instance, the computer analysis system may send a message to a second system, e.g., the computer for which the telemetry tree was generated, indicating that no anomalous activity was detected. In these examples, the second system may be a client device and the computer analysis system may receive the telemetry tree from an antivirus application that determines whether any malicious applications are executing on the client device. The message may indicate that a scan of processes currently executing on the client device, or that were previously executing on the client device, are not likely malicious.

The order of steps in the process 500 described above is illustrative only, and performing an action based on whether one of the multiple anomaly scores indicates that a relationship indicated by a respective edge in the telemetry tree represents a potentially anomalous relationship can be performed in different orders. For example, the computer analysis system may update the historical telemetry data for values not included in the historical telemetry data before adding new values to the historical telemetry data. In some example, the computer analysis system determines whether the anomaly scores satisfy the threshold score, step 510, before updating the historical telemetry data, e.g., before performing one or both of steps 506 or 508.

In some implementations, the process 500 can include additional steps, fewer steps, or some of the steps can be divided into multiple steps. For example, the computer analysis system may perform steps 502, 504, 510, and 512. In some examples, the computer analysis system may perform steps 502, 504, 510, and 514. The computer analysis system may perform steps 502, 504, and 510 through 514.

Example System Relationship Analysis Process Flow

Figure 6:
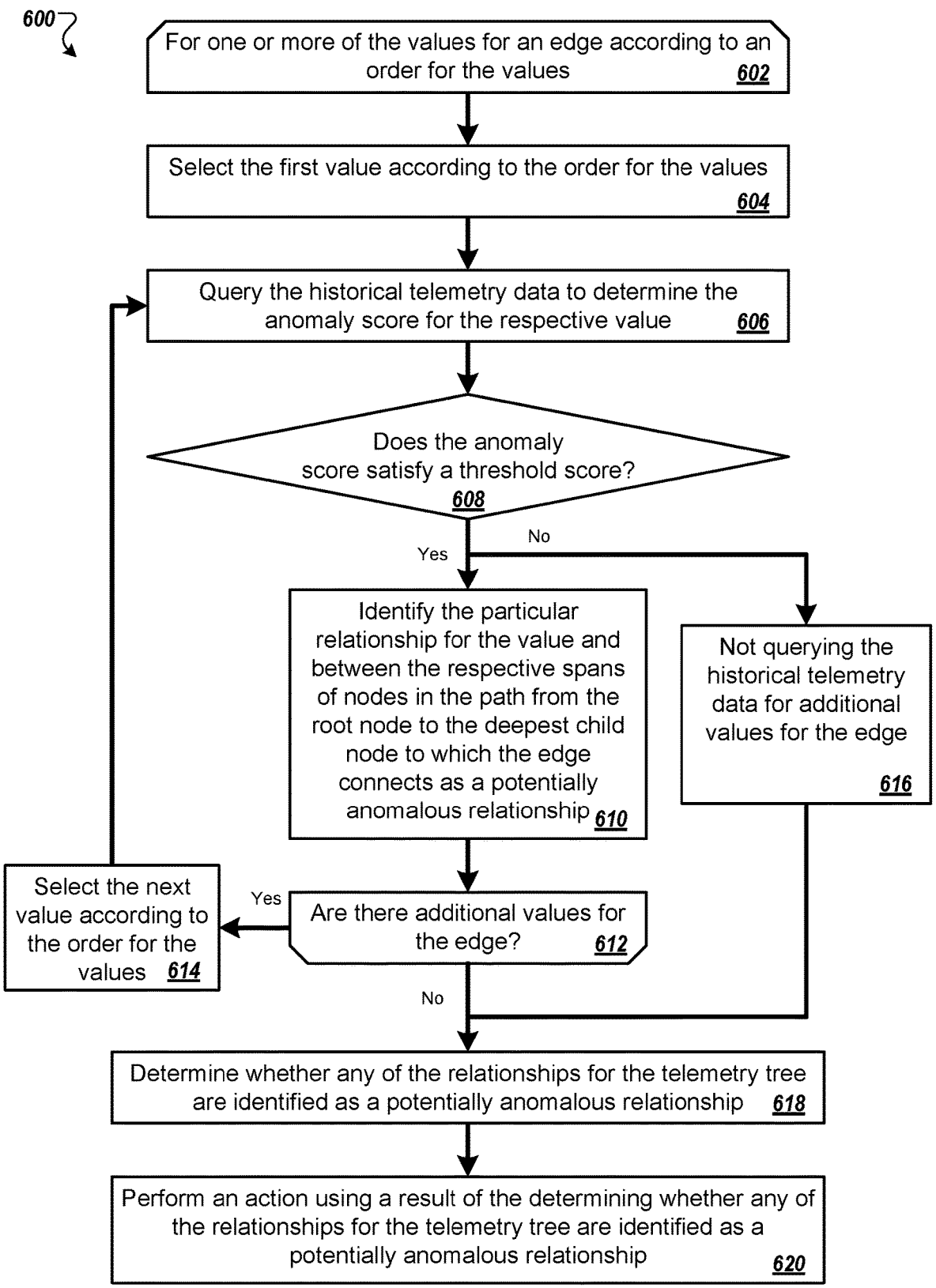
FIG. 6 is a flow diagram of a process for determining whether values for an edge indicate a potentially anomalous relationship.

FIG. 6 is a flow diagram of a process 600 for determining whether values for an edge indicate a potentially anomalous relationship. For example, the process 600 can be used by the computer analysis system 102 from the environment 100.

A computer analysis system, for one or more of the values for an edge according to an order for the values (602), selects the first value according to the order for the values (604). For example, the computer analysis system receives a telemetry tree for which some of the edges in the telemetry tree have two or more values, e.g., relationship values. The telemetry tree has a depth of at least two, e.g., a root node, a child node, and a grandchild node.

The computer analysis system selects, for an edge, a first value according to an order for the values. The order for the values is defined by the subtrees associated with the edge. A first subtree, and a first value, are based on a subtree that starts at the root node. For instance, the first value indicates a relationship between the root node of the telemetry tree and the child node connected to the edge. The second subtree, and the second value, are based on a subtree that starts at a child of the root node for the telemetry tree. For instance, the second value indicates a relationship between the child node of the root node and a child node connected to the edge to which the second value relates.

In the example shown in FIG. 4, for the edge connecting the command process 408 and the ping process 410, the first value is SRV04 424, the second value is SRV13 426, the third value is SRV22 428, and the fourth value is SRV31 430. The computer analysis system processes the first value first, and if necessary based on the process 600 as described below, processes the second value second, and so on.

Returning to FIG. 6, the computer analysis system queries the historical telemetry data to determine the anomaly score for the respective value (606). For example, the computer analysis system uses the first value as input for the historical telemetry data, e.g., during a first execution of step 606. The computer analysis system receives, in response, the anomaly score for the first value.

The computer analysis system determines whether the anomaly score satisfies a threshold score (608). As described above, the computer analysis system may perform one of multiple different types of comparisons to determine whether the anomaly score satisfies the threshold score. For instance, the computer analysis system may compare the anomaly score and the threshold score. When the computer analysis system determines that the anomaly score is less than the threshold score, the computer analysis system may determine that the anomaly score satisfies the threshold score.

In response to determining that the anomaly score satisfies the threshold score, the computer analysis system identifies the particular relationship for the value and between the respective spans of nodes in the path from the root node to the deepest child node to which the edge connects as a potentially anomalous relationship (610). In some examples, the value may indicate whether the particular relationship is a potentially malicious relationship.

After performing step 610, the computer analysis system determines whether there are additional values for the edge (612). For instance, the computer analysis system determines whether the edge connects to the root node. If so, the computer analysis system may stop performing steps in the process 600, may proceed to step 618, or may repeat step 602 for another edge in the telemetry tree.

In response to determining that there are additional values for the edge, the computer analysis system selects the next value according to the order for the values (614). For example, when the computer analysis system determines that a first value for the edge indicates a potentially anomalous relationship, the computer analysis system repeats step 606, and potentially other steps in the process 600, using a second value for the edge, e.g., SRV13 426.

In response to determining that there are no additional values for the edge, the computer analysis system determines whether any of the relationships for the telemetry tree are identified as a potentially anomalous relationship (618).

For instance, the computer analysis system may keep a list of relationships that are identified as potentially anomalous for a telemetry tree. After analyzing each of the edges in the telemetry tree, the computer analysis system may determine whether the list is empty, e.g., and no potentially anomalous relationships were identified, or includes one or more values for potentially anomalous relationships.

The computer analysis system analyzes each of the edges before performing any action, e.g., creates a complete list of potentially anomalous relationships, to allow the computer analysis system to determine an action or set of actions to perform. For example, the computer analysis system may perform a different action or set of actions depending on the relationships that are included in the list of potentially anomalous relationships.

In response to determining that the anomaly score does not satisfy the threshold score, the computer analysis system does not query the historical telemetry data for additional values for the edge (616). For instance, referring to FIG. 4, when the computer analysis system determines that the relationship value SRV02 represents a relationship that is not likely anomalous, the computer analysis system skips the relationship value SRV22, e.g., does not query the historical telemetry data using the relationship value SRV22.

Returning to FIG. 6, the computer analysis system may proceed to step 618 and determine whether any of the relationships for the telemetry tree are identified as potentially anomalous. In some examples, the computer analysis system determines whether there is another edge in the telemetry tree for analysis and, if so, selects a first score for the other edge, e.g., performs steps 602 through 616 for the other edge.

The computer analysis system performs an action using a result of the determining whether any of the relationships for the telemetry tree are identified as a potentially anomalous relationship (620). For instance, the computer analysis system may determine an action or set of actions to perform using the relationships identified as potentially anomalous. The action or set of actions may be for the computer analysis system to perform, a second system to perform, or a combination of both. For example, the computer analysis system may generate data for a user interface that represents the telemetry tree and the potentially anomalous relationships. In some examples, the computer analysis system may send instructions to the second system to cause the second system to terminate execution of a process or application, uninstall a process or application from memory, or both. The computer analysis system may analyze the potentially anomalous relationships further to determine whether they indicate telemetry for a new application.

In some implementations, the process 600 can include additional steps, fewer steps, or some of the steps can be divided into multiple steps. For example, the computer analysis system can perform steps 602 through 616, e.g., without performing steps 618 or 620. In some examples, the computer analysis system may perform some or all of the process 600 as part of the process 500.

Example Computer Process Flow

Figure 7:
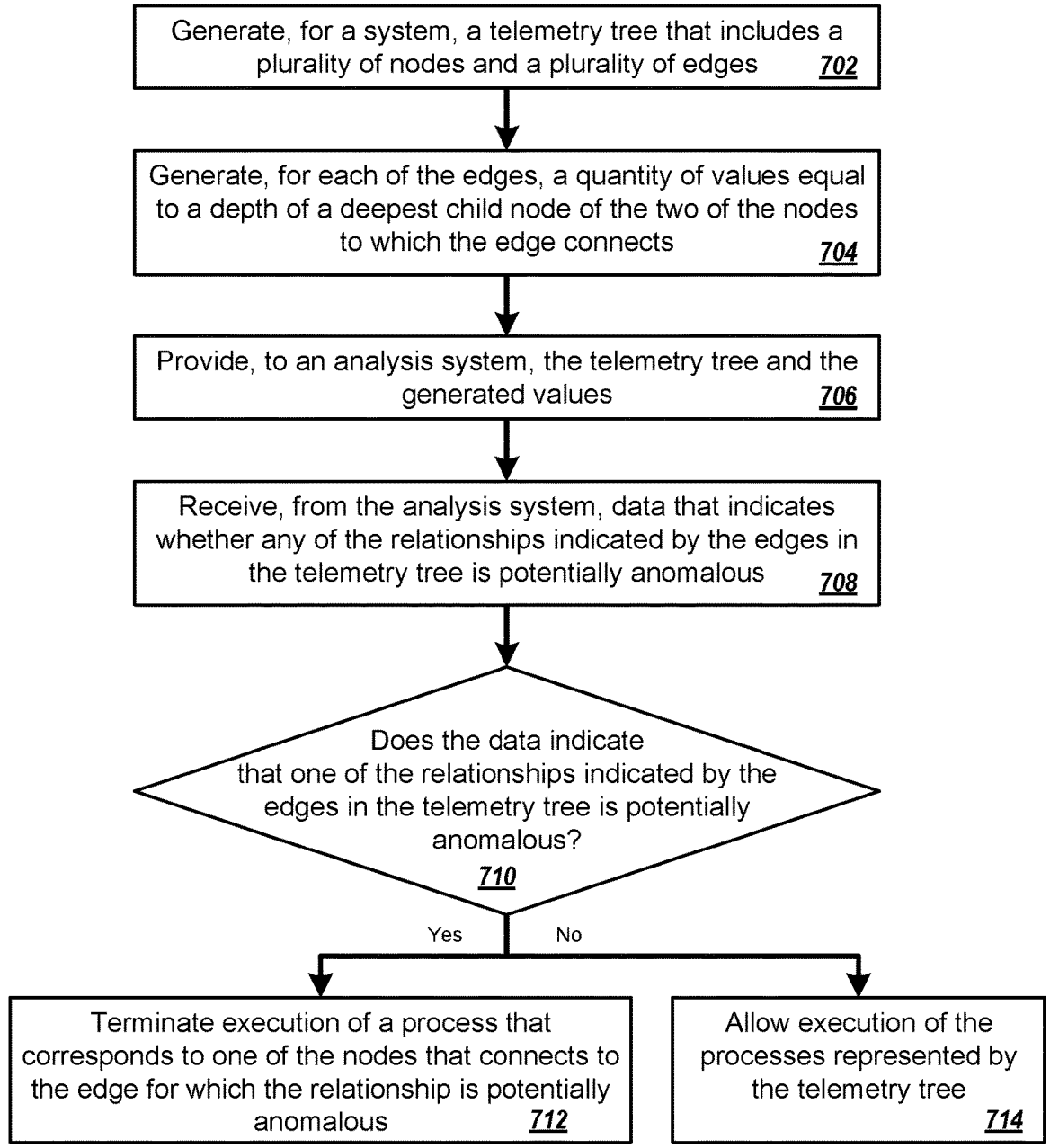
FIG. 7 is a flow diagram of a process for a performing an action using data that indicates whether any relationships indicated by edges in a telemetry tree are potentially anomalous.

FIG. 7 is a flow diagram of a process 700 for a performing an action using data that indicates whether any relationships indicated by edges in a telemetry tree are potentially anomalous. For example, the process 700 can be used by one of the computers 110*a-c* from the environment 100.

A computer generates, for a system, a telemetry tree that includes a plurality of nodes and a plurality of edges (702). The system may be the computer or another system. The system may include one or more devices, e.g., one or more computers. Each node in the telemetry tree represents a telemetry value of a telemetry type on the system. The telemetry tree may represent each node as a tuple. One value in the tuple may represent the telemetry type. One value in the tuple may represent the telemetry value for the telemetry type. One of the nodes in the telemetry tree is a root node. Each edge in the telemetry tree connects two of the nodes and indicates a relationship between the two of the nodes connected to the edge.

The computer generates, for each of the edges, a quantity of values equal to a depth of a deepest child node of the two of the nodes to which the edge connects (704). Each value represents a relationship between respective spans of nodes in a path from the root node to the deepest child node to which the edge connects.

In some implementations, the computer generates only a single value for each edge, e.g., a root relationship value. The computer, or another system, may use the single value to generate, for each of the edges, a quantity of values, e.g., subtree relationship values, equal to a depth of the deepest child node of the two nodes to which the edge connects.

In some implementations, the computer generates only a single value for each leaf. The computer may generate a root relationship value for each leaf such that the other values can be generated using the root relationship value for the respective leaf.

The computer provides, to an analysis system, the telemetry tree and the generated values (706). The computer may store the telemetry tree in a memory to which the analysis system has access. The computer may provide the telemetry tree to the analysis system using a network. In some examples, the computer may be part of the analysis system, e.g., one of multiple computers included in the analysis system.

The computer receives, from the analysis system, data that indicates whether any of the relationships indicated by the edges in the telemetry tree is potentially anomalous (708). The data may indicate whether any of the relationships indicated by the edges in the telemetry tree is potentially malicious. The data may be a score, e.g., an anomaly score. The data may indicate an action for the computer to perform. The action may be to terminate a process, an application, or both, associated with the relationship, e.g., a child or parent process for the edge that corresponds to the relationship. The action may be to remove data from a memory, e.g., uninstall an application, a software library, or both, associated with the relationship. In some examples, the data may indicate that no potentially anomalous activity was detected.

The computer determines whether the data indicate that one of the relationships indicated by the edges in the telemetry tree is potentially anomalous (710). For instance, the computer determines whether to perform a corrective action for a potentially anomalous telemetry value included in the telemetry tree.

In response to determining that the data indicates that one of the relationships indicated by the edges in the telemetry tree is potentially anomalous, the computer terminates execution of a process that corresponds to one of the nodes that connects to the edge for which the relationship is potentially anomalous (712). The computer may remove data for the process for memory in addition to or instead of terminating the process. The computer may remove additional data associated with the process from memory.

In some implementations, the computer may generate a prompt that requests user input indicating whether or not the process is for a new application. For instance, the computer may generate a user interface with information about the potentially anomalous relationship, a process associated with the potentially anomalous relationship, or both. The user interface may request user input that indicates whether the potentially anomalous relationship is based on an application recently installed on the computer and is not malicious, should not be flagged as anomalous, or both.

In response to determining that the data indicates that none of the relationships indicated by the edges in the telemetry tree is potentially anomalous, the computer allows execution of the processes represented by the telemetry tree (714). For instance, the computer does not change execution of any of the processes based on the data received from the analysis system.

In some implementations, the process 700 can include additional steps, fewer steps, or some of the steps can be divided into multiple steps. For example, the computer may perform steps 702 through 708 without performing steps 710 through 714. In some examples, the computer may perform another action using the received data.

Optional Implementation Details

In some implementations, a computer analysis system may receive a telemetry tree that includes relationship values. For instance, a computer may generate a telemetry tree for telemetry instances that occurred on the computer and include relationship values for the telemetry nodes in the telemetry tree. The computer may provide the telemetry tree that includes the relationship values to the computer analysis system.

The computer analysis system may combine values used as input for a hash function in any appropriate manner. For instance, when the computer analysis system has three values, Val1, Val2, and Val3, the computer analysis system may concatenate the three values, or provide all three values separately as input to a hash function. The computer analysis system may use any appropriate hash function that generates unique hash values for different combinations of input.

In some implementations, the computer analysis system may simulate multiple runtime environments to determine which types of telemetry to monitor. For instance, the computer analysis system may use the simulations to determine telemetry values that are repeatable in a non-anomalous environment. The computer analysis system may then simulate runtime environments of infected systems, e.g., systems infected with malware or viruses, and determine which telemetry types are affected by the infection. The computer analysis system can use the various simulations to determine particular types of telemetry that satisfy threshold values for determining whether a particular telemetry instance is anomalous, and potentially malicious, or not.

The computer analysis system may use any appropriate values for the anomaly scores. For instance, the scores may be text strings, integer numbers, floating point values, values between zero and one, or a combination of two or more of these. In some examples, the computer analysis system may use integer values for the anomaly scores. When the computer analysis system determines that a particular relationship, whether for two nodes or a subtree with more than two nodes, is anomalous, e.g., malicious, and should be flagged as anomalous no matter how many times the particular relationship is seen, the computer analysis system may change the score to a text string, e.g., "anomalous."

In some implementations, the computer analysis system may receive data that identifies a particular relationship value and indicates that the relationship value is not anomalous. For instance, the computer analysis system may receive data that identifies a new process, e.g., for a new application. The computer analysis system may determine another telemetry value, e.g., a system process, that is likely to initiate the new process. The computer analysis system determines a relationship value for the new process and the other telemetry value. The computer analysis system adds the relationship value to the historical telemetry data with an anomaly score that indicates that the relationship value is not anomalous.

In some implementations, the computer analysis system may analyze telemetry trees for a cloud system. The computer analysis system may determine whether an application, process, or another type of telemetry for the cloud system is potentially anomalous. The computer analysis system may use the cloud system to generate the historical telemetry data, analyze data from the cloud system during runtime, or both.

In some implementations, certain data may be treated in one or more ways before it is stored or used, so that telemetry data, personally identifiable information, or both, are removed. For example, when the computer analysis system receives one or more root relationship values from a computer, the computer analysis system does not receive actual telemetry data from the computer, e.g., protecting user privacy, system privacy, or both.

In some implementations, the computer analysis system receives data that identifies multiple potentially anomalous relationships in response to providing the historical database a relationship value for a relationship that is likely anomalous. For instance, the computer analysis system may provide the historical database with a relationship value. In response, when a telemetry relationship identified by the relationship value is not likely anomalous, the computer analysis system may receive data that indicates that the relationship is not likely anomalous. When the telemetry relationship is likely anomalous, the computer analysis system may receive multiple relationship values. Each of the relationship values may be for relationships that are likely anomalous, e.g., when all of the relationships for an edge are likely anomalous.

In some examples, all of the relationship values except for one may be for relationships that are likely anomalous. For instance, when a particular edge has six relationship values, three of which correspond to for relationships that are likely anomalous, the computer analysis system may receive four relationship values: the three which correspond to relationships that are likely anomalous and the first one that identifies the relationship that is not likely anomalous and includes data for the other two relationships that are not likely anomalous. The computer analysis system may receive data that indicates whether all of the relationship values correspond to relationships that are likely anomalous or all except for one of the relationship values correspond to relationships that are likely anomalous. This may allow the computer analysis system to send fewer queries to the historical database to determine where a potential anomaly occurs while determining the location of the potential anomaly.

Additional Implementation Details

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 8:
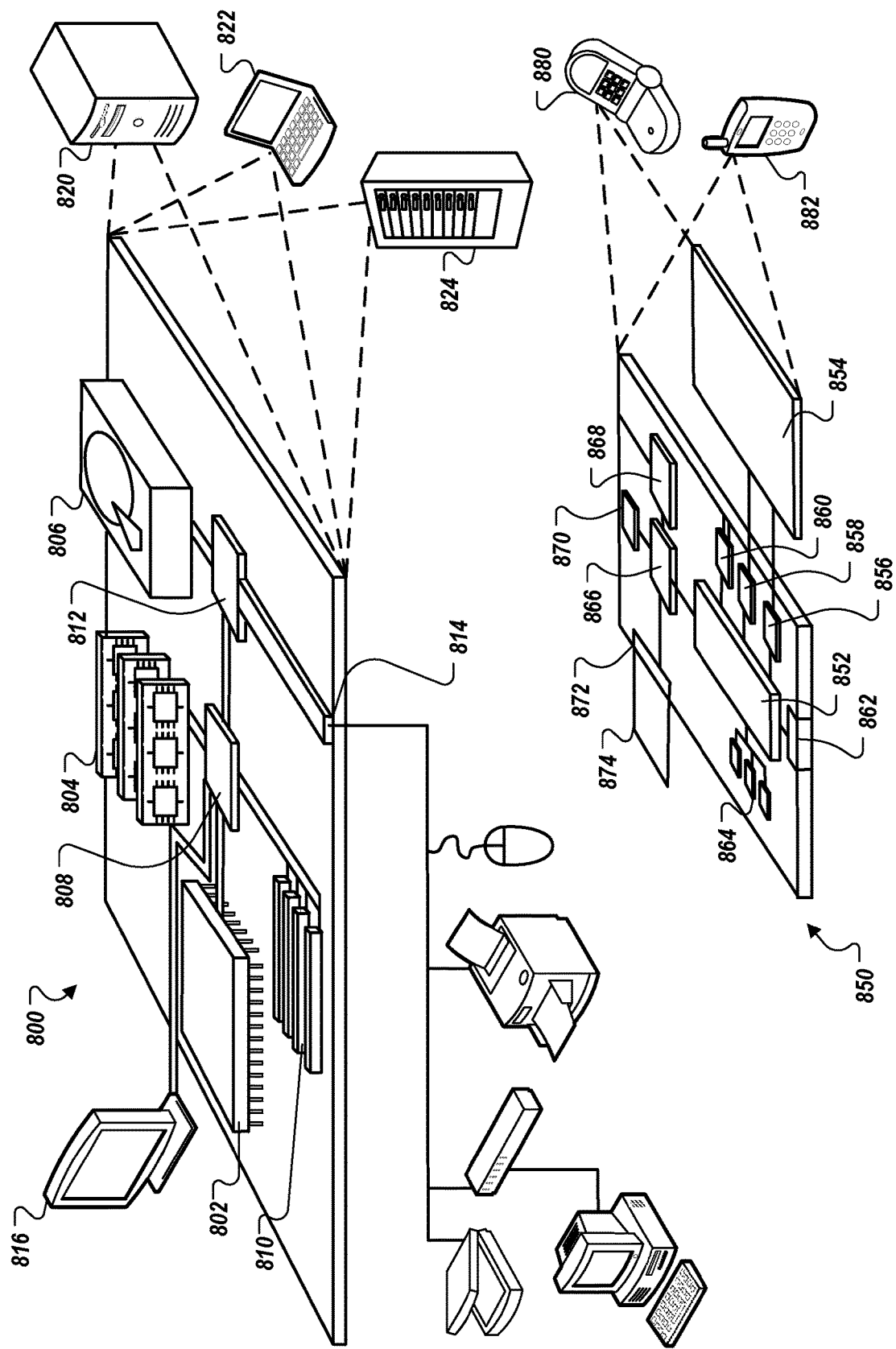
FIG. 8 is a block diagram of a computing system that can be used in connection with computer-implemented methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication (e.g., via a docking procedure) or for wireless communication (e.g., via BLUETOOTH or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a BLUETOOTH, WIFI, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

accessing data describing a telemetry tree that includes a plurality of nodes and edges, wherein:
each node represents a telemetry value of a telemetry type, and one of the nodes is a root node;
each edge connects two of the nodes and indicates a relationship between the two of the nodes connected to the edge; and
each edge has a number of values based on a depth of a deepest child node of the two of the nodes to which the edge connects, and each value represents a relationship between respective spans of nodes in a path from the root node to the deepest child node to which the edge connects, each respective span of nodes being of a different length and proportional to a depth of the deepest child node from one of the root node or a descendent child node from the root node that is not the deepest child node;

querying, for each of the edges in the telemetry tree using at least one value for the edge from the number of values, historical telemetry data that quantifies an anomaly score for each value to determine whether the relationship indicated by the edge in the telemetry tree represents a potentially malicious relationship; and performing an action using a result of the querying of the historical telemetry data that indicates whether one of the anomaly scores indicates that the relationship indicated by the edge in the telemetry tree represents a potentially malicious relationship.

2. The system of claim 1, wherein each of the values is a hash value that specifically identifies a respective span that begins from the root node or the descendent child from the root node and each respectively descends to the deepest child node.

3. The system of claim 1, wherein querying, for each of the edges in the telemetry tree using at least one value for the edge from the number of values, the historical telemetry data that quantifies an anomaly score for each value comprises querying, for each of the edges in the telemetry tree using at least one value for the edge from the number of values, the historical telemetry data to determine a frequency that indicates a number of times the respective value has been seen historically.

4. The system of claim 1, wherein:
querying, for each of the edges in the telemetry tree using at least one value for the edge from the number of values, the historical telemetry data that quantifies an anomaly score for each value comprises:
for one or more of the values for a particular edge according to an order for the values:
querying the historical telemetry data to determine the anomaly score for the respective value;
determining whether the anomaly score satisfies a threshold score; and
in response to determining that the anomaly score satisfies the threshold score, identifying the respective relationship for the value and between the respective spans of nodes in the path from the root node to the deepest child node to which the edge connects as a potentially malicious relationship and querying the historical telemetry data for additional values for the particular edge; or in response to determining that the anomaly score does not satisfy the threshold score, not querying the historical telemetry data for additional values for the particular edge; and performing an action using a result of the querying of the historical telemetry data that indicates whether one of the anomaly scores indicates that the relationship indicated by the edge in the telemetry tree represents a potentially malicious relationship comprises:
determining whether any of the relationships for the telemetry tree are identified as a potentially malicious relationship; and
performing an action using a result of the determining whether any of the relationships for the telemetry tree are identified as a potentially malicious relationship.

5. The system of claim 4, wherein performing an action using a result of the determining whether any of the relationships for the telemetry tree are identified as a potentially malicious relationship comprises performing an action for the relationships identified as potentially malicious relationships in response to determining that at least one of the relationships for the telemetry tree is identified as a potentially malicious relationship.

6. The system of claim 1, comprising a database that includes the historical telemetry data.

7. The system of claim 1, the operations comprising sending, for each of the values, a message to cause a database to update an anomaly score, in the historical telemetry data for the respective value, that indicates a number of times the respective value has been seen.

8. The system of claim 1, the operations comprising sending, for each of the values not included in the historical telemetry data, a message to cause a database to add the respective value with a respective anomaly score to the historical telemetry data.

9. A computer-implemented method, comprising:
accessing data describing a telemetry tree that includes a plurality of nodes and edges, wherein:
each node represents a telemetry value of a telemetry type, and one of the nodes is a root node;
each edge connects two of the nodes and indicates a relationship between the two of the nodes connected to the edge; and
each edge has a number of values based on a depth of a deepest child node of the two of the nodes to which the edge connects, and each value represents a relationship between respective spans of nodes in a path from the root node to the deepest child node to which the edge connects, each respective span of nodes being of a different length and proportional to a depth of the deepest child node from one of the root node or a descendent child node from the root node that is not the deepest child node;

querying, for each of the edges in the telemetry tree using at least one value for the edge from the number of values, historical telemetry data that quantifies an anomaly score for each value to determine whether the relationship indicated by the edge in the telemetry tree represents a potentially malicious relationship; and performing an action using a result of the querying of the historical telemetry data that indicates whether one of the anomaly scores indicates that the relationship indicated by the edge in the telemetry tree represents a potentially malicious relationship.

10. The computer-implemented method of claim 9, wherein each of the values is a hash value that specifically identifies a respective span that begins from the root node or the descendent child from the root node and each respectively descends to the deepest child node.

11. The computer-implemented method of claim 9, wherein querying, for each of the edges in the telemetry tree using at least one value for the edge from the number of values, the historical telemetry data that quantifies an anomaly score for each value comprises querying, for each of the edges in the telemetry tree using at least one value for the edge from the number of values, the historical telemetry data to determine a frequency that indicates a number of times the respective value has been seen historically.

12. The computer-implemented method of claim 9, wherein:
querying, for each of the edges in the telemetry tree using at least one value for the edge from the number of values, the historical telemetry data that quantifies an anomaly score for each value comprises:
for one or more of the values for a particular edge according to an order for the values:
querying the historical telemetry data to determine the anomaly score for the respective value;
determining whether the anomaly score satisfies a threshold score; and
in response to determining that the anomaly score satisfies the threshold score, identifying the respective relationship for the value and between the respective spans of nodes in the path from the root node to the deepest child node to which the edge connects as a potentially malicious relationship and querying the historical telemetry data for additional values for the particular edge; or
in response to determining that the anomaly score does not satisfy the threshold score, not querying the historical telemetry data for additional values for the particular edge; and
performing an action using a result of the querying of the historical telemetry data that indicates whether one of the anomaly scores indicates that the relationship indicated by the edge in the telemetry tree represents a potentially malicious relationship comprises:
determining whether any of the relationships for the telemetry tree are identified as a potentially malicious relationship; and
performing an action using a result of the determining whether any of the relationships for the telemetry tree are identified as a potentially malicious relationship.

13. The computer-implemented method of claim 12, wherein performing an action using a result of the determining whether any of the relationships for the telemetry tree are identified as a potentially malicious relationship comprises performing an action for the relationships identified as potentially malicious relationships in response to determining that at least one of the relationships for the telemetry tree is identified as a potentially malicious relationship.

14. The computer-implemented method of claim 9, the operations comprising sending, for each of the values, a message to cause a database to update an anomaly score, in the historical telemetry data for the respective value, that indicates a number of times the respective value has been seen.

15. The computer-implemented method of claim 9, the operations comprising sending, for each of the values not included in the historical telemetry data, a message to cause a database to add the respective value with a respective anomaly score to the historical telemetry data.

16. A non-transitory computer storage device on which are stored instructions that are operable, when executed by a one or more computers, cause the one or more computers to perform operations comprising:
accessing data describing a telemetry tree that includes a plurality of nodes and edges, wherein:
each node represents a telemetry value of a telemetry type, and one of the nodes is a root node;
each edge connects two of the nodes and indicates a relationship between the two of the nodes connected to the edge; and
each edge has a number of values based on a depth of a deepest child node of the two of the nodes to which the edge connects, and each value represents a relationship between respective spans of nodes in a path from the root node to the deepest child node to which the edge connects, each respective span of nodes being of a different length and proportional to a depth of the deepest child node from one of the root node or a descendent child node from the root node that is not the deepest child node;
querying, for each of the edges in the telemetry tree using at least one value for the edge from the number of values, historical telemetry data that quantifies an anomaly score for each value to determine whether the relationship indicated by the edge in the telemetry tree represents a potentially malicious relationship; and
performing an action using a result of the querying of the historical telemetry data that indicates whether one of the anomaly scores indicates that the relationship indicated by the edge in the telemetry tree represents a potentially malicious relationship.

* * * * *